(12) United States Patent
Iida

(10) Patent No.: US 7,847,521 B2
(45) Date of Patent: Dec. 7, 2010

(54) POWER SUPPLY SYSTEM FOR VEHICLE

(75) Inventor: Takahide Iida, Ichinomiya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 115 days.

(21) Appl. No.: 12/289,447

(22) Filed: Oct. 28, 2008

(65) Prior Publication Data
US 2009/0115375 A1    May 7, 2009

(30) Foreign Application Priority Data
Nov. 7, 2007    (JP)    ............... 2007-289802

(51) Int. Cl.
*H02J 7/00*    (2006.01)
(52) U.S. Cl. ............ 320/138; 320/109; 180/65.29
(58) Field of Classification Search ............ 320/109, 320/138
See application file for complete search history.

(56) References Cited

U.S. PATENT DOCUMENTS

| | | | | |
|---|---|---|---|---|
| 5,656,916 A | * | 8/1997 | Hotta | 320/160 |
| 5,686,812 A | * | 11/1997 | Hotta | 320/134 |
| 5,926,004 A | * | 7/1999 | Henze | 320/109 |
| 7,362,597 B2 | * | 4/2008 | Ishikawa et al. | 363/71 |
| 2008/0205106 A1 | * | 8/2008 | Nakamura et al. | 363/123 |

FOREIGN PATENT DOCUMENTS

| | | |
|---|---|---|
| JP | A-62-048226 | 3/1987 |
| JP | A-10-66269 | 3/1998 |
| JP | A-10-150729 | 6/1998 |
| JP | A-2000-354331 | 12/2000 |
| JP | A-2007-97342 | 4/2007 |
| JP | A-2007-195336 | 8/2007 |

OTHER PUBLICATIONS

Aug. 17, 2010 Office Action issued in Japanese Patent Application No. 2007-289802 (with translation).

* cited by examiner

*Primary Examiner*—Edward Tso
*Assistant Examiner*—Ramy Ramadan
(74) *Attorney, Agent, or Firm*—Oliff & Berridge PLC

(57) ABSTRACT

A power supply system for a vehicle includes: batteries; motor generators operating as rotating electrical machines driven by electric power in the batteries when the vehicle is running, and constituting a first charger when the batteries are charged by electric power received from a source external to the vehicle and; an inlet receiving the electric power supplied from the external source; a second charger receiving the electric power supplied from the external source and charging the batteries; and a control device selecting one of the first and second chargers and performing control for converting the electric power supplied from the external source to the inlet into charging electric power using the selected charger. Thus, a power supply system for a vehicle that is chargeable from various power supplies at the time of charging and has reduced charge loss can be provided.

4 Claims, 3 Drawing Sheets

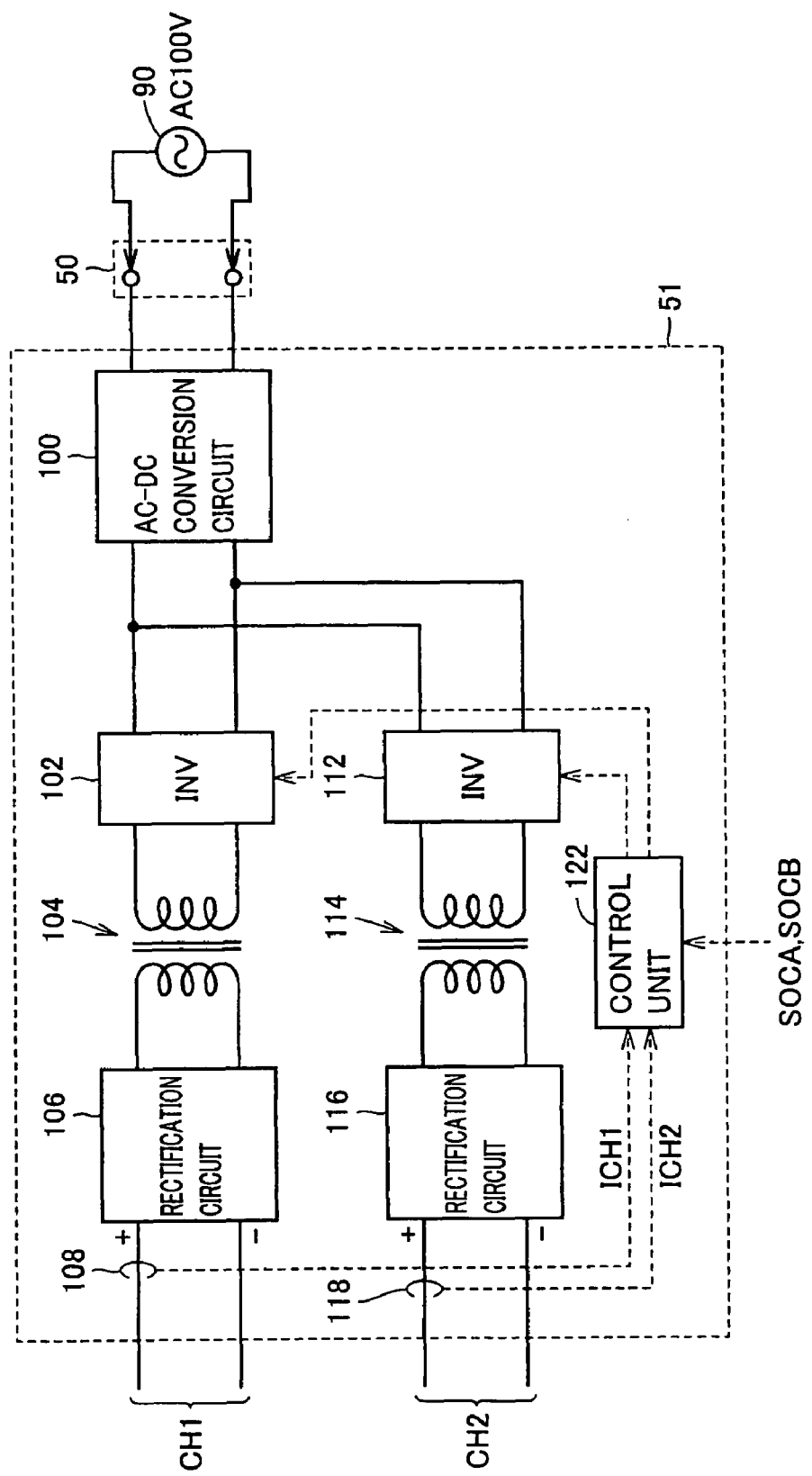

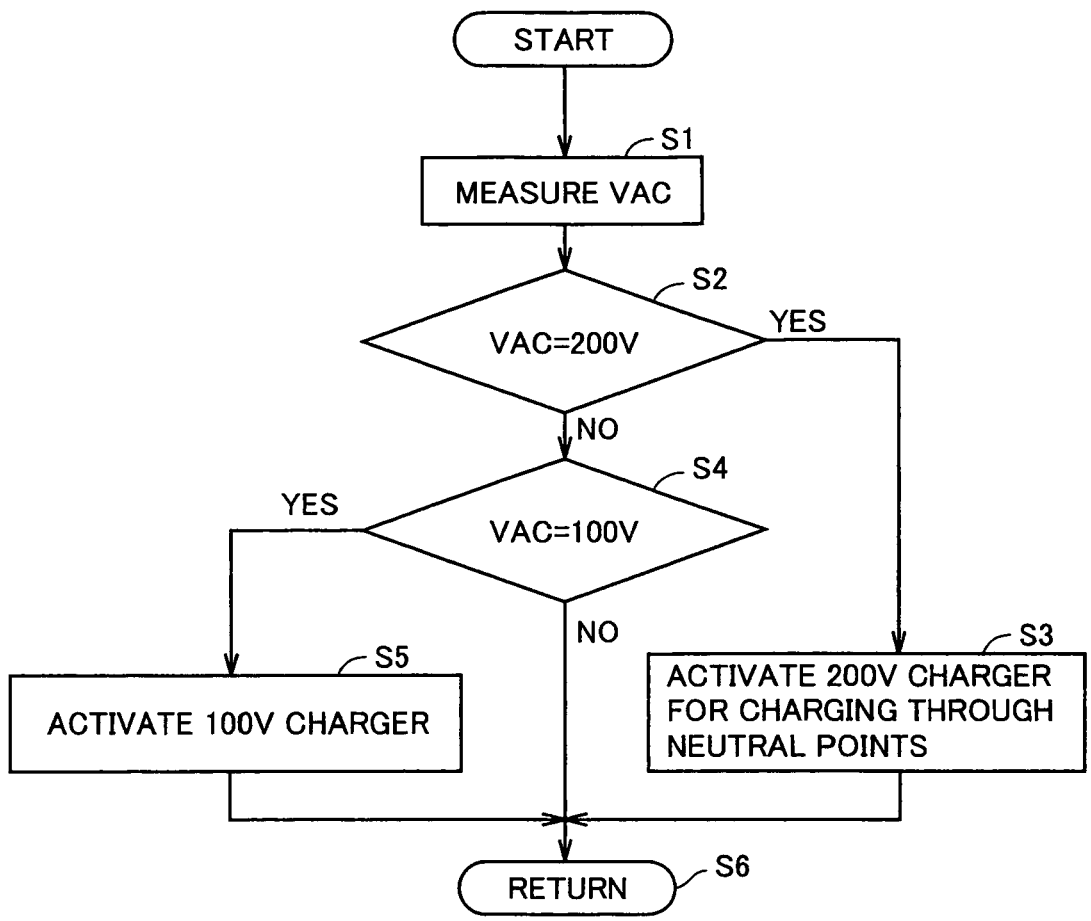

POWER SUPPLY SYSTEM FOR VEHICLE

This nonprovisional application is based on Japanese Patent Application No. 2007-289802 filed on Nov. 7, 2007 with the Japan Patent Office, the entire contents of which are hereby incorporated by reference.

BACKGROUND OF THE INVENTION

1. Field of the Invention

The present invention relates to a power supply system for a vehicle, and in particular, to a power supply system for a vehicle equipped with a power storage device that is chargeable from a source external to the vehicle.

2. Description of the Background Art

In recent years, vehicles equipped with a power supply device and using its electric power to drive a motor, such as electric vehicles, hybrid vehicles, fuel cell vehicles, and the like have been attracting attention as environmentally-friendly vehicles.

In such a vehicle, an externally chargeable configuration has also been under consideration. Generally, in ordinary households, a single-phase 100 V or single-phase 200 V commercial power supply is often used as a power supply for charging.

Japanese Patent Laying-Open No. 2000-354331 discloses a configuration in which, when charging is performed using a 200 V commercial power supply, an exclusive charger is used, and when charging is performed using a 100 V commercial power supply, electric power is received through a neutral point of a field coil of a motor for running a vehicle, and some of diodes used when receiving electric power from the 200 V commercial power supply are commonly used.

To provide environmentally-friendly vehicles, it is important to consider reducing loss during charging as much as possible. In ordinary households, a large amount of electric power cannot be charged from a 100 V system. In contrast, a motor for running a vehicle and an inverter driving the motor can handle a large amount of electric power to be able to respond to sudden acceleration. Instead, a large amount of electric power is consumed to drive the motor and the inverter, and thus loss is increased when a small amount of electric power is handled.

Therefore, since loss is increased when a small amount of electric power of a 100 V system is supplied through a neutral point of a field coil of a motor for running a vehicle as disclosed in Japanese Patent Laying-Open No. 2000-354331, there is still room for improvement in this respect.

Further, in some of ordinary households, a 200 V power supply is also available to operate a large-capacity air conditioner or the like.

SUMMARY OF THE INVENTION

One object of the present invention is to provide a power supply system for a vehicle that is chargeable from various power supplies at the time of charging and has reduced charge loss.

In summary, the present invention is a power supply system for a vehicle including: a power storage device; first and second rotating electrical machines operating as rotating electrical machines driven by electric power in the power storage device when the vehicle is running, and constituting a first charger when the power storage device is charged by electric power received from a source external to the vehicle; an input port receiving the electric power supplied from the source external to the vehicle; a second charger receiving the electric power supplied from the source external to the vehicle and charging the power storage device; and a control device selecting one of the first and second chargers and performing control for converting the electric power supplied from the source external to the vehicle to the input port into charging electric power using the selected charger.

Preferably, the control device determines which one of the first and second chargers is to be selected in accordance with a voltage supplied to the input port.

Preferably, the input port can selectively receive a first power supply voltage and a second power supply voltage lower than the first power supply voltage. The second charger receives the second power supply voltage and performs charging more efficiently than the first charger.

More preferably, the power supply system for a vehicle further includes first and second inverters driving the first and second rotating electrical machines, respectively. The first and second inverters constitute the first charger together with stator coils of the first and second rotating electrical machines when the power storage device is charged by the electric power received from the source external to the vehicle. The first charger is supplied with an alternating current (AC) voltage from first and second electric power input lines connected to neutral points of the stator coils of the first and second rotating electrical machines, respectively. The second charger is a charger separate from the first and second rotating electrical machines and the first and second inverters.

Further preferably, the first charger receives an AC voltage of 200 V as the first power supply voltage and charges the power storage device, and the second charger receives an AC voltage of 100 V as the second power supply voltage and charges the power storage device.

According to the present invention, a relatively large amount of electric power that requires less charging time can be received, and charge loss can be reduced when charging is performed with a relatively small amount of electric power.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a block diagram showing an exemplary configuration of a charger 51 of FIG. 1.

FIG. 3 is a flow chart illustrating control for the selection of a charger performed by a control device 30 of FIG. 1.

DESCRIPTION OF THE PREFERRED EMBODIMENTS

Figure 1:
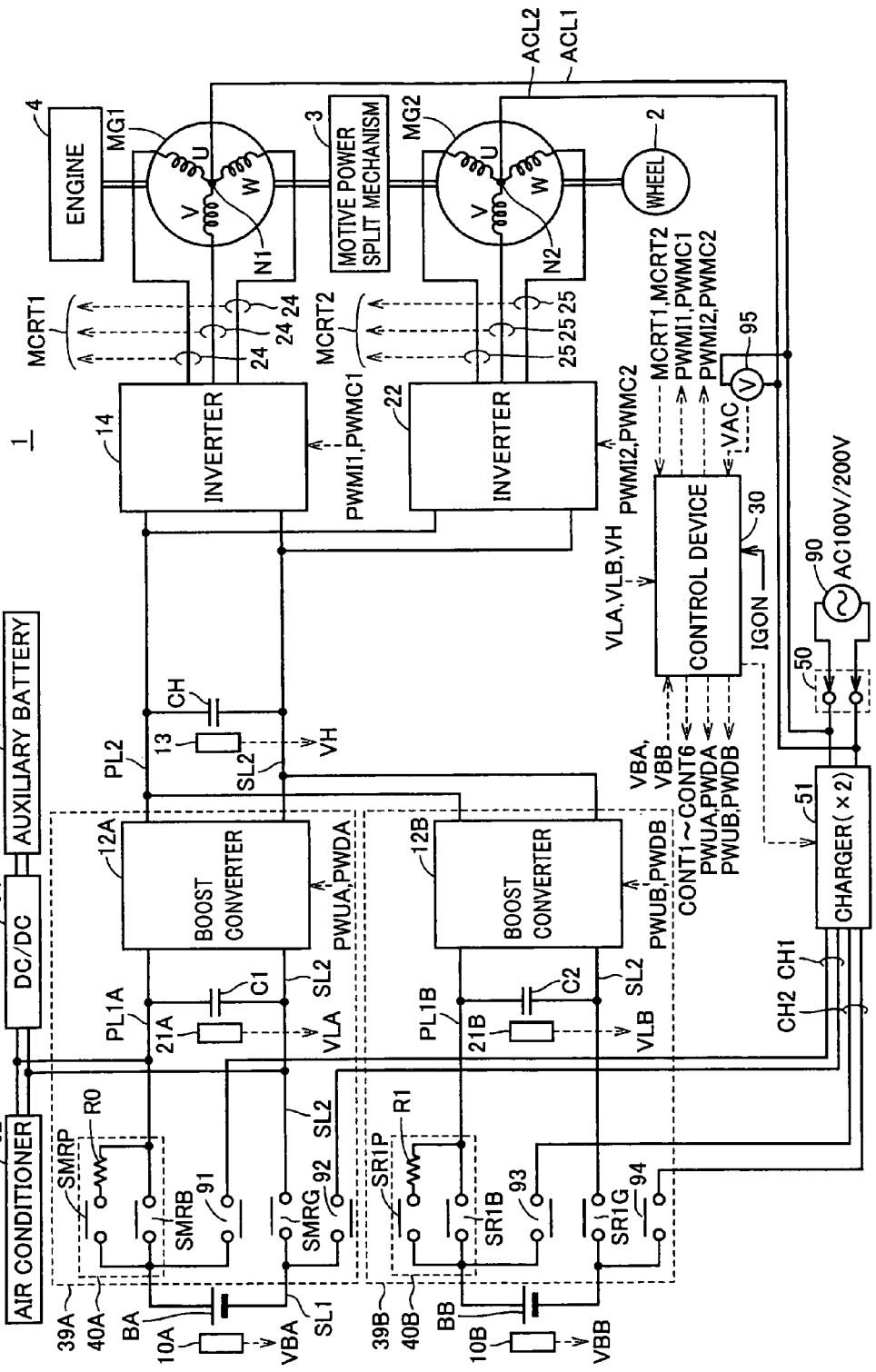
FIG. 1 shows a main configuration of a vehicle 1 in accordance with an embodiment of the present invention.

An embodiment of the present invention will now be described in detail with reference to the drawings, in which identical or corresponding parts will be designated by the same reference numerals, and the description thereof will not be repeated.

FIG. 1 shows a main configuration of a vehicle 1 in accordance with an embodiment of the present invention.

Referring to FIG. 1, vehicle 1 includes batteries BA and BB serving as power storage devices, voltage conversion units 39A and 39B, a smoothing capacitor CH, voltage sensors 10A, 10B, and 13, inverters 14 and 22, an engine 4, motor generators MG1 and MG2, a motive power split mechanism 3, a wheel 2, and a control device 30.

Voltage conversion units 39A and 39B include boost converters 12A and 12B, smoothing capacitors C1 and C2, and voltage sensors 21A and 21B, respectively.

Smoothing capacitor C1 is connected between a power supply line PL1A and a ground line SL2. Voltage sensor 21A detects a voltage VLA across smoothing capacitor C1, and outputs voltage VLA to control device 30. Boost converter 12A boosts a voltage across terminals of smoothing capacitor C1.

Smoothing capacitor C2 is connected between a power supply line PL1B and ground line SL2. Voltage sensor 21B detects a voltage VLB across smoothing capacitor C2, and outputs voltage VLB to control device 30. Boost converter 12B boosts a voltage across terminals of smoothing capacitor C2.

Smoothing capacitor CH smoothes the voltages boosted by boost converters 12A and 12B. Voltage sensor 13 detects a voltage VH across terminals of smoothing capacitor CH, and outputs voltage VH to control device 30.

Inverter 14 converts a direct current (DC) voltage supplied from boost converter 12B or 12A into a three-phase AC voltage, and outputs the three-phase AC voltage to motor generator MG1. Inverter 22 converts a DC voltage supplied from boost converter 12B or 12A into a three-phase AC voltage, and outputs the three-phase AC voltage to motor generator MG2.

Motive power split mechanism 3 is a mechanism coupled to engine 4 and motor generators MG1, MG2 to split motive power therebetween. For example, a planetary gear mechanism having three rotation axes of a sun gear, a planetary gear, and a ring gear can be used as the motive power split mechanism. When rotations of two of the three rotation axes are determined in the planetary gear mechanism, rotation of the other one rotation axis is inevitably determined. These three rotation axes are connected to rotation axes of engine 4, motor generator MG1, and motor generator MG2, respectively. The rotation axis of motor generator MG2 is coupled to wheel 2 by a reduction gear and a differential gear not shown. A decelerator for the rotation axis of motor generator MG2 may be further mounted or an automatic transmission may be mounted inside motive power split mechanism 3.

Voltage conversion unit 39A includes a connection unit 40A provided on a positive electrode side, and a system main relay SMRG serving as a connection unit provided on a negative electrode side. Connection unit 40A includes a system main relay SMRB connected between a positive electrode of battery BA and power supply line PL1A, and a system main relay SMRP and a limiting resistor R0 connected in series with each other and connected in parallel with system main relay SMRB. System main relay SMRG is connected between a negative electrode of battery BA (a ground line SL1) and ground line SL2.

Conductive/nonconductive states of system main relays SMRP, SMRB, and SMRG are controlled by control signals CONT1 to CONT3 supplied from control device 30, respectively.

Voltage sensor 10A measures a voltage VBA across terminals of battery BA. Although not shown, a current sensor detecting a current flowing into battery BA is provided to monitor the state of charge (SOC) of battery BA together with voltage sensor 10A. As battery BA, for example, a secondary battery such as a lead-acid battery, a nickel hydride battery, or a lithium ion battery, or a large-capacity capacitor such as an electric double layer capacitor can be used.

Voltage conversion unit 39B includes a connection unit 40B provided on a positive electrode side, and a system main relay SR1G serving as a connection unit provided on a negative electrode side. Connection unit 40B includes a system main relay SR1B connected between a positive electrode of battery BB and power supply line PL1B, and a system main relay SR1P and a limiting resistor R1 connected in series with each other and connected in parallel with system main relay SR1B. System main relay SR1G is connected between a negative electrode of battery BB and ground line SL2.

Conductive/nonconductive states of system main relays SR1P, SR1B, and SR1G are controlled by control signals CONT4 to CONT6 supplied from control device 30, respectively.

Ground line SL2 extends through boost converters 12A and 12B to inverters 14 and 22.

Voltage sensor 10B measures a voltage VBB across terminals of battery BB. Although not shown, a current sensor detecting a current flowing into battery BB is provided to monitor the state of charge of battery BB together with voltage sensor 10B. As battery BB, for example, a secondary battery such as a lead-acid battery, a nickel hydride battery, or a lithium ion battery, or a large-capacity capacitor such as an electric double layer capacitor can be used.

Inverter 14 is connected to power supply line PL2 and ground line SL2. Inverter 14 receives the boosted voltage from boost converters 12A and 12B, and drives motor generator MG1 to, for example, start engine 4. Inverter 14 also returns electric power generated in motor generator MG1 by motive power transmitted from engine 4, to boost converters 12A and 12B. On this occasion, boost converters 12A and 12B are controlled by control device 30 to operate as step-down circuits.

A current sensor 24 detects a current flowing into motor generator MG1 as a motor current value MCRT1, and outputs motor current value MCRT1 to control device 30.

Inverter 22 is connected to power supply line PL2 and ground line SL2 in parallel with inverter 14. Inverter 22 converts the DC voltage output from boost converters 12A and 12B into a three-phase AC voltage, and outputs the three-phase AC voltage to motor generator MG2 driving wheel 2. Inverter 22 also returns electric power generated in motor generator MG2 by regenerative braking, to boost converters 12A and 12B. On this occasion, boost converters 12A and 12B are controlled by control device 30 to operate as step-down circuits.

A current sensor 25 detects a current flowing into motor generator MG2 as a motor current value MCRT2, and outputs motor current value MCRT2 to control device 30.

Control device 30 receives torque command values and rotation speeds of motor generators MG1 and MG2, values of voltages VBA, VBB, VLA, VLB, and VH, motor current values MCRT1 and MCRT2, and an activation signal IGON. Then, control device 30 outputs to boost converter 12B a control signal PWUB giving an instruction to boost a voltage, a control signal PWDB giving an instruction to step down a voltage, and a shut-down signal giving an instruction to inhibit operation.

Further, control device 30 outputs to inverter 14 a control signal PWMI1 giving a drive instruction to convert the DC voltage output from boost converters 12A and 12B into an AC voltage for driving motor generator MG1, and a control signal PWMC1 giving a regenerative instruction to convert an AC voltage generated in motor generator MG1 into a DC voltage and return the DC voltage to boost converters 12A and 12B.

Similarly, control device 30 outputs to inverter 22 a control signal PWMI2 giving a drive instruction to convert the DC voltage into an AC voltage for driving motor generator MG2, and a control signal PWMC2 giving a regenerative instruction to convert an AC voltage generated in motor generator MG2 into a DC voltage and return the DC voltage to boost converters 12A and 12B.

The power storage device mounted in this vehicle is externally chargeable. Therefore, vehicle 1 further includes an electric power input inlet 50, a charger 51, and an electric power input channel to which outputs CH1, CH2 of charger 51 are connected.

Electric power input inlet 50 is a terminal for connecting to vehicle 1 a commercial power supply 90 (for example, AC 100 V) external to the vehicle. In vehicle 1, battery BA or BB can be charged from commercial power supply 90 external to the vehicle that is connected to electric power input inlet 50.

An electric power input line ACL1 has one end connected to one terminal of inlet 50, and the other end connected to a neutral point N1 of a three-phase coil of motor generator MG1.

An electric power input line ACL2 has one end connected to the other terminal of inlet 50, and the other end connected to a neutral point N2 of a three-phase coil of motor generator MG2.

A voltage across electric power input lines ACL1 and ACL2, that is, a voltage to be input into inlet 50, is measured by a voltage sensor 95, and a voltage value VAC is output to control device 30.

Charger 51 can receive electric power supplied from a source external to the vehicle, and simultaneously supply first charging electric power and second charging electric power to batteries BA and BB, respectively. Charger 51 includes the first output CH1 outputting the first charging electric power to battery BA, and the second output CH2 outputting the second charging electric power to battery BB.

The first output CH1 is connected to battery BA via charging relays 91 and 92, not through system main relays SMRB and SMRG between battery BA and the first boost converter 12A.

The second output CH2 is connected to battery BB via charging relays 93 and 94, not through system main relays SR1B and SR1G between battery BB and the second boost converter 12B.

Preferably, charger 51 determines magnitudes of the first charging electric power and the second charging electric power based on the states of batteries BA and BB, and distributes to batteries BA and BB the electric power supplied from the source external to the vehicle.

External charging with a voltage of 200 V that can supply a relatively large amount of electric power (approximately 6000 W) is performed by configuring the charger with stator coils of the two motor generators and inverters 14 and 22 not used for running the vehicle when the vehicle is parked (i.e., when the vehicle is not running).

However, the stator coils and inverters 14 and 22 are designed for running the vehicle, and if they are used to perform charging with a voltage of 100 V, loss is increased, contributing to deterioration of charging efficiency.

Specifically, since external charging with a voltage of 100 V is performed using an ordinary electric outlet for household use and the like, the charging should be performed over a long period of time using electric power much smaller (approximately 1200 W) than electric power charged when the vehicle is running. When such charging is performed using a switching power supply configured with inverters 14 and 22, drive loss in the switching power supply is increased and the switching speed of a semiconductor is slow, resulting in deterioration of efficiency.

Therefore, charging efficiency when charging with a voltage of 100 V can be improved by designing charger 51 to be optimized for the external charging with a voltage of 100 V that supplies a small amount of charging electric power.

Further, the states of charge (SOCs) of batteries BA and BB can be matched by configuring charger 51 to distribute to batteries BA and BB the electric power supplied from the source external to the vehicle in a distribution ratio changed in accordance with the SOCs of batteries BA and BB.

It is to be noted that, at the time of charging with a voltage of 200 V, the SOCs of batteries BA and BB can be matched by operating boost inverters 12A and 12B in accordance with the SOCs of batteries BA and BB.

FIG. 2 is a block diagram showing an exemplary configuration of charger 51 of FIG. 1.

As shown in FIG. 2, charger 51 includes an AC-DC conversion circuit 100 converting an externally supplied AC voltage into a DC voltage, a first inverter 102 receiving the DC voltage converted by AC-DC conversion circuit 100 and converting the DC voltage into an AC voltage having a frequency different from that of the externally supplied AC voltage, a second inverter 112 receiving the DC voltage converted by AC-DC conversion circuit 100 and converting the DC voltage into an AC voltage having a frequency different from that of the externally supplied AC voltage, and a control unit 122 performing operation control for inverters 102 and 112 based on the states of batteries BA and BB.

Charger 51 further includes a transformer 104 having a primary side coil to which the AC voltage output from inverter 102 is applied, a rectification circuit 106 rectifying an AC voltage induced in a secondary side coil of transformer 104 to a DC voltage, and a current sensor 108 monitoring a current ICH1 flowing into output CH1 of rectification circuit 106.

Charger 51 further includes a transformer 114 having a primary side coil to which the AC voltage output from inverter 112 is applied, a rectification circuit 116 rectifying an AC voltage induced in a secondary side coil of transformer 114 to a DC voltage, and a current sensor 118 monitoring a current ICH2 flowing into output CH2 of rectification circuit 116.

It is desirable that batteries BA and BB have the same state of charge when charging is completed. For that purpose, control unit 122 receives the states of charge SOCA and SOCB of batteries BA and BB from control device 30 of FIG. 1, and distributes input electric power to the batteries in accordance with the received SOCA and SOCB.

FIG. 3 is a flow chart illustrating control for the selection of a charger performed by control device 30 of FIG. 1. The process of the flow chart is invoked from a prescribed main routine and performed at regular time intervals or every time when a prescribed condition is satisfied.

Referring to FIGS. 1 and 3, firstly in step SI, control device 30 reads voltage value VAC detected by voltage sensor 95. Then, in step S2, control device 30 determines whether voltage value VAC is 200 V.

When voltage value VAC is 200 V in step S2, the process proceeds to step S3. In step S3, control device 30 activates inverters 14 and 22 as a 200 V charger for charging through the neutral points. Then, control device 30 controls inverters 14 and 22 in a coordinated manner to operate them as AC-DC converters. On this occasion, the SOCs of batteries BA and BB can be matched by operating boost inverters 12A and 12B in accordance with the SOCs of batteries BA and BB.

When voltage value VAC is not 200 V in step S2, the process proceeds to step S4. In step S4, control device 30 determines whether voltage value VAC is 100 V.

When voltage value VAC is 100 V in step S4, the process proceeds to step S5. In step S5, control device 30 activates charger 51 as a 100 V charger. On this occasion, control unit 122 receives the states of charge SOCA and SOCB of batteries BA and BB from control device 30 of FIG. 1, and controls inverters 102 and 112 to distribute input electric power to the batteries in accordance with the received SOCA and SOCB.

When the activation process is completed in steps S3 and S5, or when it is not determined in step S4 that voltage value VAC is 100 V, the process proceeds to step S6, and the control returns to the main routine.

Finally, referring to FIG. 1 and others again, a power supply system for a vehicle disclosed in the present embodiment will be described as a whole. The power supply system for a vehicle includes: a power storage device (batteries BA, BB); first and second rotating electrical machines (motor generators MG1, MG2) operating as rotating electrical machines driven by electric power in the power storage device when the vehicle is running, and constituting a first charger when the power storage device is charged by electric power received from a source external to the vehicle; an input port (inlet 50) receiving the electric power supplied from the source external to the vehicle; a second charger (charger 51) receiving the electric power supplied from the source external to the vehicle and charging the power storage device; and control device 30 selecting one of the first and second chargers and performing control for converting the electric power supplied from the source external to the vehicle to the input port into charging electric power using the selected charger.

Preferably, control device 30 determines which one of the first and second chargers is to be selected in accordance with a voltage supplied to the input port (inlet 50).

Preferably, the input port can selectively receive a first power supply voltage (200 V) and a second power supply voltage (100V) lower than the first power supply voltage. The second charger (charger 51) receives the second power supply voltage (100 V) and performs charging more efficiently than the first charger (constituted including coils of motor generators MG1, MG2).

More preferably, the power supply system for a vehicle disclosed in the present embodiment further includes inverters 14, 22 driving the first and second rotating electrical machines (motor generators MG1, MG2), respectively. Inverters 14, 22 constitute the first charger together with stator coils of the first and second rotating electrical machines (motor generators MG1, MG2) when the power storage device is charged by the electric power received from the source external to the vehicle. The first charger is supplied with an AC voltage from electric power input lines ACL1 and ACL2 connected to neutral points of the stator coils of the first and second rotating electrical machines, respectively. The second charger (charger 51) is a charger separate from the first and second rotating electrical machines (motor generators MG1, MG2) and inverters 14, 22.

Further preferably, the first charger receives an AC voltage of 200 V as the first power supply voltage and charges the power storage device, and the second charger receives an AC voltage of 100 V as the second power supply voltage and charges the power storage device.

In a configuration not having charger 51, how to reduce energy used becomes an issue when a small amount of electric power of a 100 V system is supplied, whereas in a technique of charging through a neutral point, it is necessary to drive an inverter for running a vehicle and many other parts, and thus it is difficult to reduce energy consumption during charging. Specifically, since the inverter for running the vehicle is commonly used as a component of an AC-DC converter for external charging, it is necessary to drive a high power semiconductor in the inverter designed for running the vehicle, and thus it becomes difficult to reduce the drive power.

In contrast, in the present embodiment, for charging a small amount of electric power (approximately 1200 W) from a 100 V system, charging is performed by charger 51 optimally designed for that purpose, reducing loss in an auxiliary battery system. For charging a large amount of electric power (approximately 6000 W) from a 200 V system, a charging technique receiving electric power through a neutral point of a motor generator and using an inverter for running a vehicle as a charger is employed. Thereby, each charger can be used in the area for which each charging technique is suitable. Consequently, when electric power of approximately 1200 W is charged from a 100 V system, charge loss is reduced, and when electric power of approximately 6000 W is charged from a 200 V system, an undesirable increase in size caused by providing a separate charger can be avoided.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A power supply system for a vehicle comprising:
   a power storage device;
   an input port that receives electric power supplied from a source external to the vehicle;
   first and second rotating electrical machines that function as rotating electrical machines driven by electric power supplied from the power storage device when the vehicle is running;
   a first charger that is operably configured to receive the electric power supplied from the source external to the vehicle and thereby charge the power storage device;
   a second charger that is operably configured to receive the electric power supplied from the source external to the vehicle and thereby charge the power storage device; and
   a control device that selects either the first or the second charger to be used for converting the electric power supplied from the source external to the vehicle into charging electric power, wherein
   the first charger includes the first and second rotating electrical machines, and
   the control device selects either the first or the second charger based on a voltage detected at the input port.

2. The power supply system for a vehicle according to claim 1, wherein
   the input port can selectively receive a first power supply voltage and a second power supply voltage, the second power supply voltage being lower than the first power supply voltage, and
   the second charger receives the second power supply voltage and performs charging by the second power supply voltage more efficiently than the first charger would be able to perform with the second power supply voltage.

3. The power supply system for a vehicle according to claim 2, further comprising first and second inverters driving the first and second rotating electrical machines, respectively, wherein
   the first charger further includes the first and second inverters and stator coils associated with the first and second rotating electrical machines;
   the first charger is supplied with an AC voltage from electric power input lines connected to neutral points of the stator coils, and
   the second charger does not include the first and second rotating electrical machines or the first and second inverters.

4. The power supply system for a vehicle according to claim 3, wherein
the first power supply voltage, which is received by the first charger, is an AC voltage of 200 V, and
the second power supply voltage, which is received by the second charger, is an AC voltage of 100 V.

* * * * *